(12) United States Patent
Vaidya et al.

(10) Patent No.: US 8,277,933 B1
(45) Date of Patent: *Oct. 2, 2012

(54) LONG FIBER THERMOPLASTIC THIN-WALLED BASEPLATES FOR MISSILE APPLICATIONS AND METHODS OF MANUFACTURE

(75) Inventors: Uday Vaidya, Birmingham, AL (US); J. Barry Andrews, Birmingham, AL (US); Selvum Pillay, Birmingham, AL (US); Haibin Ning, Birmingham, AL (US)

(73) Assignee: UAB Research Foundation, Birmingham, AL (US)

( * ) Notice: Subject to any disclaimer, the term of this patent is extended or adjusted under 35 U.S.C. 154(b) by 75 days.

This patent is subject to a terminal disclaimer.

(21) Appl. No.: 12/761,835

(22) Filed: Apr. 16, 2010

Related U.S. Application Data

(60) Provisional application No. 61/170,329, filed on Apr. 17, 2009.

(51) Int. Cl.
*D04H 1/00* (2006.01)

(52) U.S. Cl. .................................. 428/292.1; 428/297.4
(58) Field of Classification Search ............... 428/292.1, 428/36.9, 297.4
See application file for complete search history.

(56) References Cited

U.S. PATENT DOCUMENTS

| | | | | |
|---|---|---|---|---|
| 5,945,643 | A * | 8/1999 | Casser | 181/290 |
| 6,863,942 | B2 * | 3/2005 | Ren et al. | 428/36.9 |
| 7,334,373 | B2 * | 2/2008 | Richards | 52/309.1 |
| 7,416,154 | B2 * | 8/2008 | Bittle et al. | 244/3.22 |
| 2007/0063095 | A1 * | 3/2007 | Bittle et al. | 244/3.21 |

* cited by examiner

*Primary Examiner* — N. Edwards
(74) *Attorney, Agent, or Firm* — Thomas, Kayden, Horstemeyer & Risley, LLP

(57) ABSTRACT

Baseplates and methods of manufacture are provided. In this regard, a representative baseplate is operative to mount a missile aeroshell, the baseplate being formed of a long fiber thermoplastic composite and exhibiting a wall thickness of no greater than approximately 0.070".

12 Claims, 10 Drawing Sheets

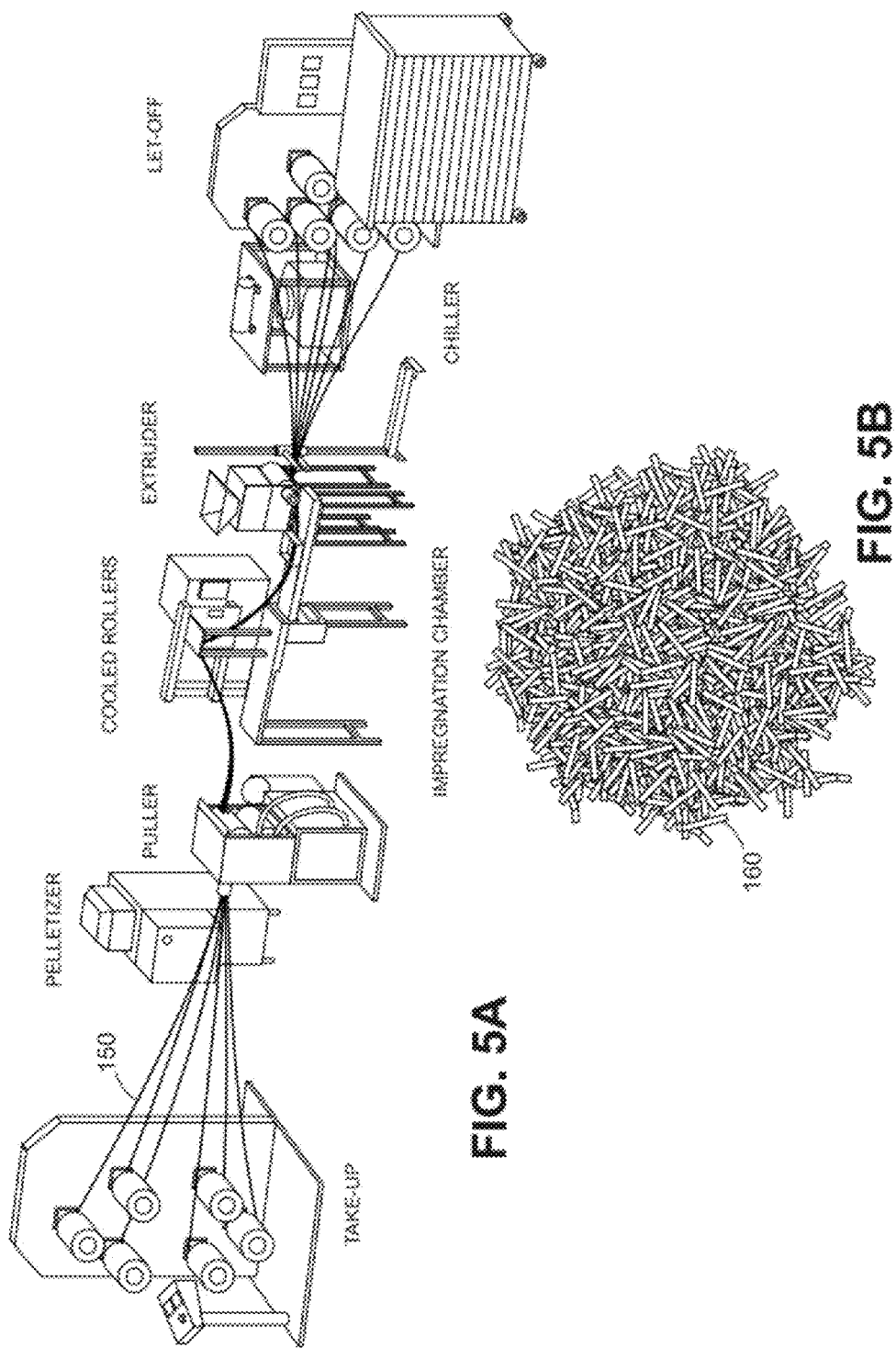

LONG FIBER THERMOPLASTIC THIN-WALLED BASEPLATES FOR MISSILE APPLICATIONS AND METHODS OF MANUFACTURE

CROSS REFERENCE TO RELATED APPLICATION

This utility application claims the benefit of and priority to U.S. Provisional Patent Application 61/170,329, which was filed on Apr. 17, 2009, and which is incorporated by reference herein in its entirety.

STATEMENT REGARDING FEDERALLY SPONSORED RESEARCH AND DEVELOPEMENT

The U.S. Government may have an interest in the subject matter of this disclosure as provided for by the terms of U.S. Army Research Lab Cooperative Agreement W911NF-04-2-0018 and contract number W31 P4Q-08-0039 awarded by U.S. Army Aviation and Missile Research Development and Engineering Center.

BACKGROUND

1. Technical Field

The disclosure relates to the manufacture of thermoplastic components.

2. Description of the Related Art

Various components are conventionally formed of metal, such as those that are subjected to significant mechanical stresses during use. By way of example, exterior components of aircraft and missiles are typically formed of metal. In such an implementation, aluminum is oftentimes the metal of choice in that aluminum offers relatively high strength at a low weight.

SUMMARY

Baseplates and methods of manufacture are provided. In this regard, an exemplary embodiment of a baseplate is operative to mount a missile aeroshell, the baseplate being formed of a long fiber thermoplastic composite and exhibiting a wall thickness of no greater than approximately 0.070".

Another exemplary embodiment of a baseplate is operative to mount a missile aeroshell, the baseplate being formed of a long fiber thermoplastic composite, the long fiber thermoplastic composite exhibiting a fiber weight fraction in a range of about 10% to 50% and fiber lengths ranging from about 10 to 25 mm.

An exemplary embodiment of a method for manufacturing a baseplate for mounting to a missile aeroshell, the method comprising forming the baseplate with a long fiber thermoplastic composite such that the aeroshell exhibits a wall thickness of no greater than approximately 0.070".

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Figure 2:
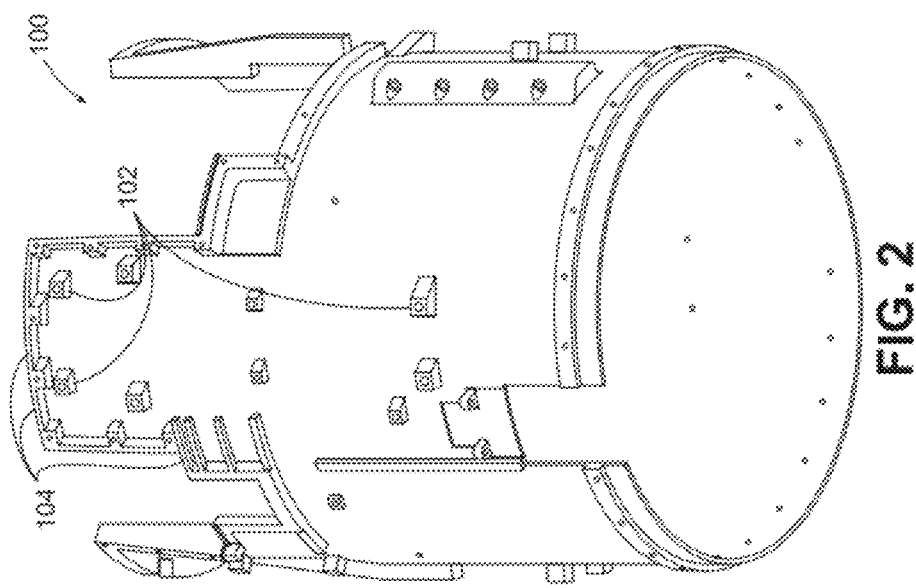
FIG. 2 depicts an exemplary embodiment of a long fiber thermoplastic (LFT) baseplate.

Before providing a more detailed description, it is to be understood that this disclosure is not limited to the particular embodiments described, as such may vary. It is also to be understood that the terminology used herein is for the purpose of describing particular embodiments only, and is not intended to be limiting.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs.

All publications and patents that may be cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, materials science, physics, engineering, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

In general, a missile can be retrofitted with a Trajectory Correction Kit (TCK). A TCK provides guidance to the missile to hit the intended target and reduce collateral damage. The TCK body is comprised of an aeroshell that is exposed to the outer environment. The aeroshell is mounted to a baseplate, to which the electronics, wires and other components are mounted. The aeroshell and the baseplate together are referred to as a TCK set. The TCK is subjected to elevated temperature, pressure loads, vibration and noise and bearing loads.

In this regard, baseplates for a TCK set have been designed, modeled, analyzed and produced with long fiber thermoplastic (LFT) composite materials. The baseplates can be produced by long fiber thermoplastic extrusion-compression molding (ECM) or long fiber thermoplastic injection molding (IM) processes.

Long fiber thermoplastic composites have a thermoplastic polymer matrix that melts when heated beyond its melting/softening temperature. The material flows under pressure, carrying fibers with the flowing polymer to fill a cavity (e.g., a cavity of a mold). A part is formed when the polymer cools and solidifies. Long fiber thermoplastic baseplates may be superior to metal (e.g., aluminum) baseplates because they are lighter, cheaper, their thermal conductivity can be tailored, and they vibrate less and possess high strength and stiffness.

It is believed that long fiber thermoplastics have never been used before for forming baseplates. For instance, thin walled carbon fiber parts in long fiber lengths of 12 mm to 25 mm are not believed to have been produced in thin walled structures (wall thickness of approximately 0.070"+0.030" to 0.100"+ 0.060") for approximately 30% (range 10% to 50%, preferably 20% to 40%) fiber weight fraction. Notably, fiber weight fraction is the amount of fiber content by weight in a material system. Generally, controlling the fiber weight fraction controls the part performance in terms of strength, stiffness and other properties.

Failure to use long fiber thermoplastics to form baseplates in the prior art may be attributed to several factors. For example, conventional wisdom indicates that the part is too thin to distribute fibers uniformly. Additionally, the material may be too highly viscous and difficult to flow particularly at high fiber loading and this prevents the mold cavity from filling. Also, fibers (e.g., carbon fibers) can dissipate heat rapidly; hence, the fiber filled polymer charge can freeze before filling the cavity, which further complicates filling.

By improving polymer flow with respect to the fiber, for example, a mold cavity can be fully filled without compromising polymer quality or fiber length. In general, as the ratio of the part surface area to its wall thickness increases, flow of the material in the mold becomes challenging. This is due to the material freezing upon contact with the mold surface, and lower amounts of molten polymer become available to fill the extremities of the cavity.

Also, the idea of using a thermoplastic in a high temperature application is generally counter intuitive. In most cases, the designers automatically discard the notion. However, by controlling the fiber loading, type of fiber and the matrix properties, this limitation can be overcome.

The LFT includes materials such as, but not limited to, thermoplastic polyurethanes, polypropylene, polyethylene (PE), polyamide (PA) based polymers, poly aryl amide (PAA), polystyrene, acrylonitrile butadiene styrene (ABS), styrene acrylonitrile (SAN), polyethersulphone (PES), polyetherimide (PEI), polyimide (PI), polyphenylene sulfide (PPS), polyetheretherketone (PEEK), polyetherketone (PEK), and combinations thereof, in conjunction with reinforcement fibers or materials such as aramid fibers (e.g., KEVLAR™ ZYLON™, TWARON™, and the like) polyethylene fibers (e.g., SPECTRAT™, DYNEEMA™, and the like), polypropylene and nylon fibers, glass fibers or materials, carbon fibers, basalt fibers and combinations thereof.

The fibers in the LFT are discontinuous fibers as opposed to continuous fibers. The LFT has fiber lengths ranging from about 10 to 50 mm, preferably from about 10 to 25 mm for ECM, and preferably from about 10 to 15 mm for IM. The LFT can include fiber loading from about 10 to 45 weight % loading of fiber in the LFT for any of these fiber lengths. Characteristics of the LFT material include, but are not limited to, fiber length and aspect ratio (length/diameter) that can be varied to optimize the strength, modulus, and impact properties of the composite as well as influence other mechanical and physical properties of the composite structure.

Figure 1:
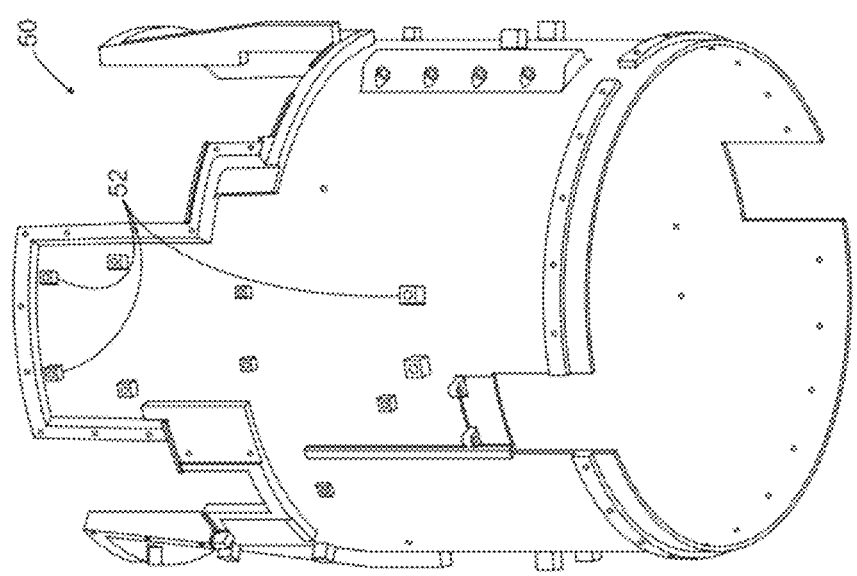
FIG. 1 depicts a prior art baseplate formed of aluminum.
Figure 4:
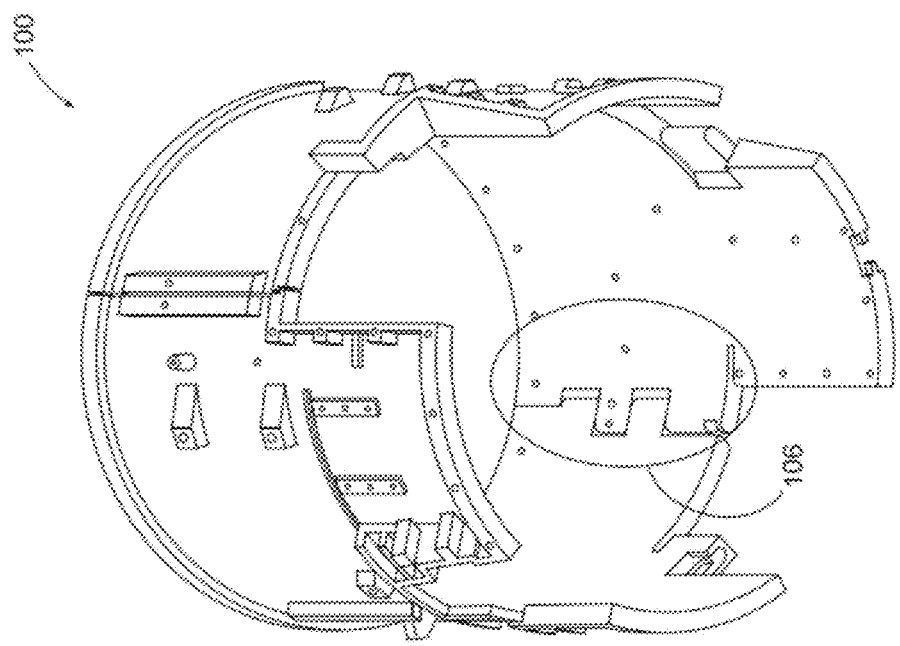
FIG. 4 depicts the LFT baseplate of FIG. 2.
Figure 3:
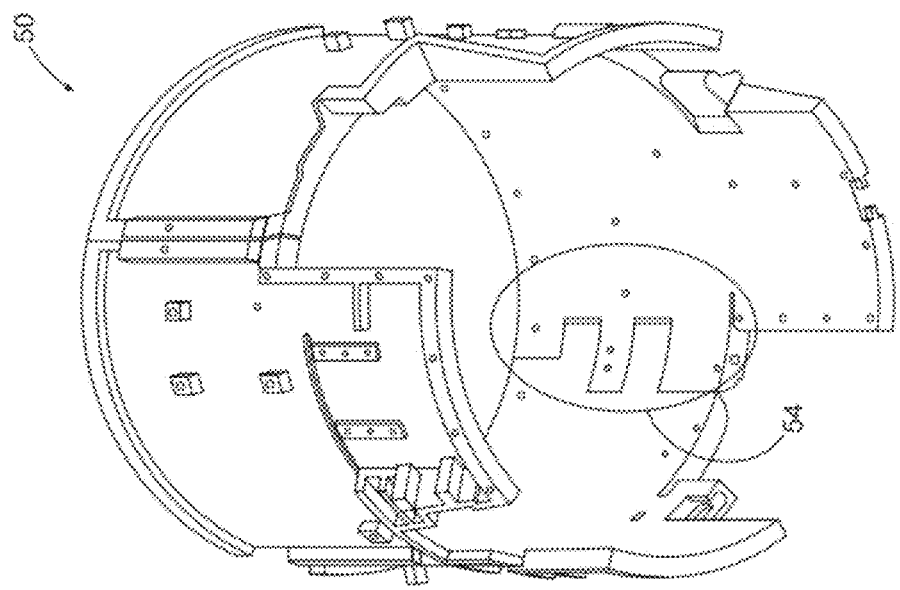
FIG. 3 depicts the prior art baseplate of FIG. 1.

FIGS. 1 and 3 depict a prior art baseplate 50 formed of aluminum, whereas FIGS. 2 and 4 depict an exemplary embodiment of a long fiber thermoplastic composite baseplate 100.

As shown more clearly in FIGS. 1 and 2, bosses 52 of baseplate 50 are redesigned in LFT baseplate 100 such that undercuts are eliminated. For instance, bosses 102 do not include undercuts. Additionally, various changes were implemented to reduce shrinkage. For example, wall segments 104 were modified to extend between adjacent bosses and wall thickness of the LFT baseplate was reduced to approximately 0.070" to avoid significant shrinkage of the long fiber composite material and, therefore, part warpage. Comparing FIGS. 3 and 4, it should also be noted that the hinge 54 of the LFT baseplate 50 was redesigned as hinge 102 in baseplate 100 for the feasibility of using a molding process. In particular, distal ends of the hinge portions have been rounded.

Figure 5C:
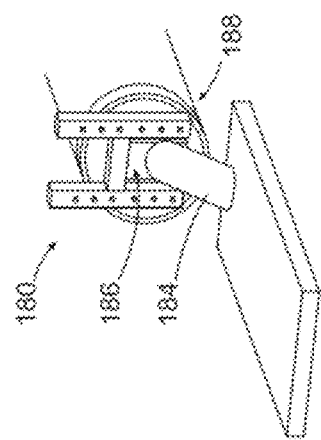
FIG. 5 depicts exemplary process steps for forming an embodiment of an LFT baseplate.

As shown in FIGS. 5A-5D, basic process components/steps for forming an LFT baseplate (such as the embodiment in FIG. 2) involve hot melt impregnation of fibers with an engineered polymer (e.g., fiber strand 150, FIG. 5A) to produce long fiber pellets (e.g., pellet 160 of FIG. 5B). By way of example, poly aryl amide (PAA) polymer can be used to produce pellets of carbon/PAA. This can involve use of various devices, such as a take-up, a pelletizer, a puller, cooled rollers, an impregnation chamber, an extruder, a let-off and a chiller, as should be known to one of ordinary skill. For instance, multiple spools of fiber strands can be loaded onto a take-up, which feeds the strands to a puller. The puller controls the take-up speed and provides the strands to cooled rollers, which orient the strands in a flattened, side-by-side arrangement. The strands then pass through an impregnation chamber that communicates with an extruder, which receives the polymer. The polymer is coated onto the strands in the impregnation chamber, after which the impregnated strands are gathered by the let-off and subsequently cooled in the chiller and pelletized.

Figure 5D:
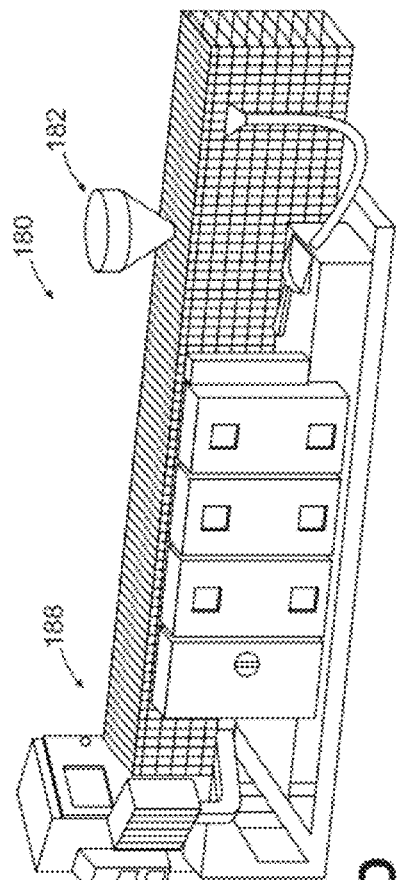
Figure 5D:
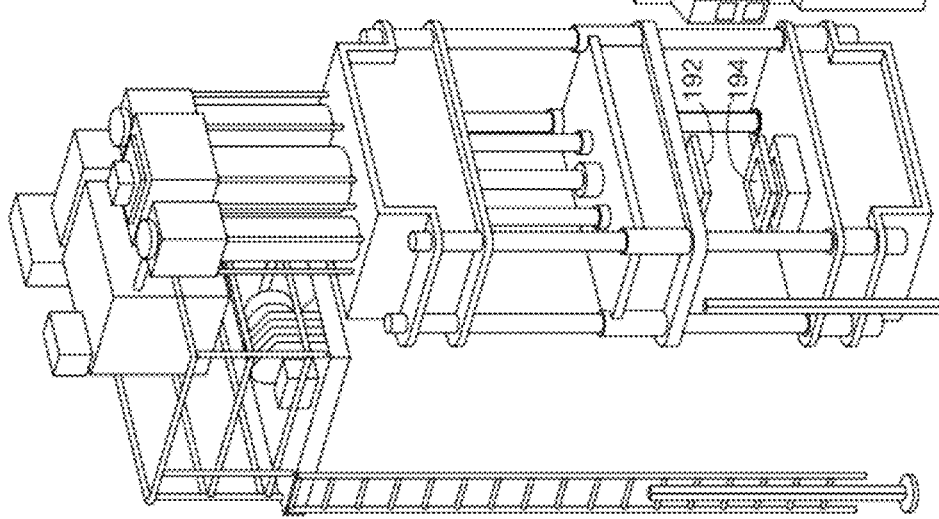

As shown in FIGS. 5C and 5D, a plasticator 180 receives long fiber pellets (such as through input 182) and produces a charge (e.g., charge 184) that is detached from other material of the plasticator via a knife 186 positioned at the output 188. The charge is then compression molded in a press 190 that includes upper and lower molds 192, 194.

Due to the thin walled geometry (approximately 0.070") of an LFT baseplate and the high thermal conductivity of carbon fibers, there is an extremely small (narrow) processing window for producing high quality parts with tight tolerance and long fiber lengths. Specifically, long fiber reinforced thermoplastic composites have a thermoplastic matrix which melts over a melting temperature range and flows under pressure. Proper temperature is one of the most important factors during processing, especially for the high temperature material such as PAA (which is a modified nylon).

During manufacture of a baseplate, temperature should be controlled on many levels—the temperature of the pellets as they work their way through the various molding steps, the resident time of the material in the plasticator, the mold temperature, the material temperature during molding, the cool down rate. In this regard, polymers retain heat during processing. However, carbon fibers dissipate heat. As such, the polymers can be thermally degraded when attempting to counteract the cooling effect due to the carbon fibers. With respect to a mold cavity, if heat is not properly managed, the polymer can degrade and lose its appearance, properties and function. Furthermore, carbon fibers are brittle and can be damaged if exposed directly to the plasticator screw surface or the mold walls. The protection of the carbon fibers by the polymer is important to minimize fiber breakage and fiber degradation during the plastication or the compression molding steps. The carbon fibers must flow to fill ribs, cut outs, steps and other intricate geometric features while retaining their starting fiber length to the extent possible.

The starting long fiber pellets disperse as thousands of filaments of fibers (the individual fiber diameter, usually is 8-12 microns, like a human hair) as they make their way through the extruder and the molding process. Heat and back pressure, if not managed properly, can cause individual fiber degradation.

Notably, high temperatures result in reduced viscosity and easier flow and fill in the mold cavity. See, for example, FIG. 6, which depicts a fiber injection molded baseplate processed at a material temperature of 580° F. and mold temperature of 250° F. Due to the thin-walled geometry of the baseplate and high thermal conductivity, heat loss is excessive, and the material starts freezing before filling the mold cavity completely. This results in an unfilled part.

Figure 7:
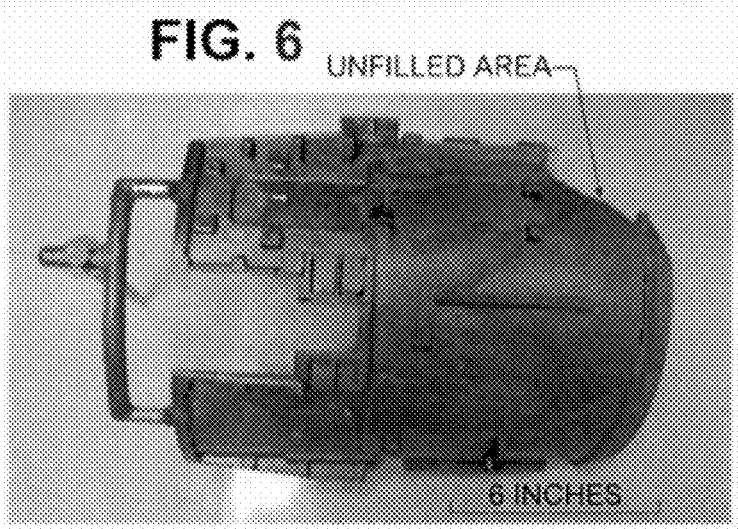
FIG. 7 depicts an embodiment of an LFT baseplate with an unfilled corner.

FIG. 7 depicts another embodiment of an LFT baseplate. This baseplate, which exhibits an unfilled corner, was processed at the material temperature of 600° F. and mold temperature of 250° F. In contrast, FIG. 8 depicts a completely filled baseplate that was obtained using a material temperature of 610° F. and mold temperature of 260° F.

Numerous process optimization, simulations and process trials varying material temperature, back pressure, mold temperature, consolidation pressure, charge volume and placement, fiber orientation, resident time in the plasticator, rate of press closure and minimized fiber length degradation have been conducted. Based on these interrelated parameters, processing parameters were determined to produce the baseplates.

Figure 6:
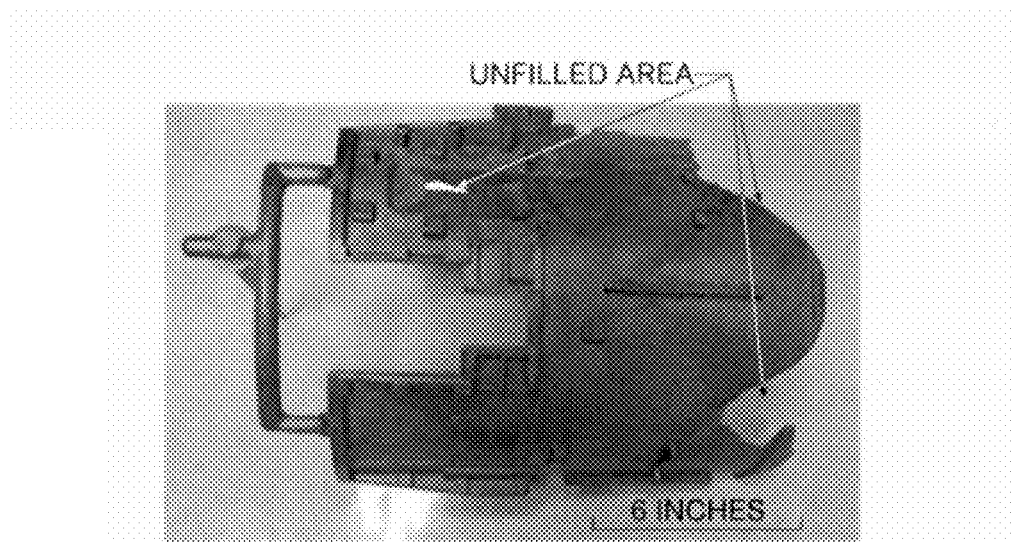
FIG. 6 depicts an embodiment of an LFT baseplate with unfilled areas.
Figure 8:
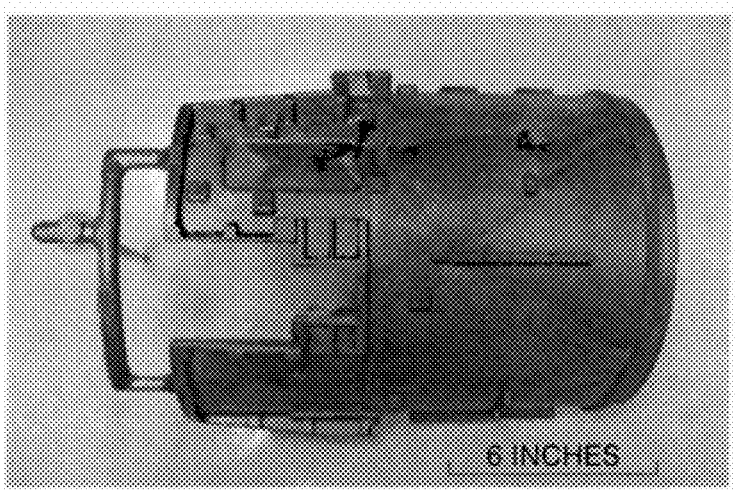
FIG. 8 depicts an embodiment of an aeroshell that does not exhibit unfilled areas and/or degradation.
Figure 9:
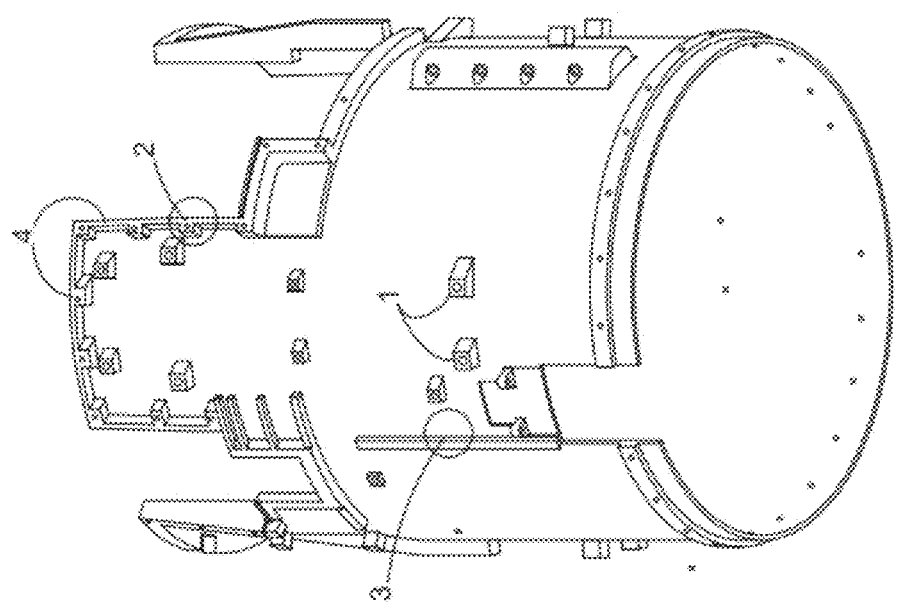
FIG. 9 is a side-by-side comparison of a prior art baseplate formed of aluminum and an exemplary embodiment of a long fiber thermoplastic (LFT) baseplate.
Figure 9:
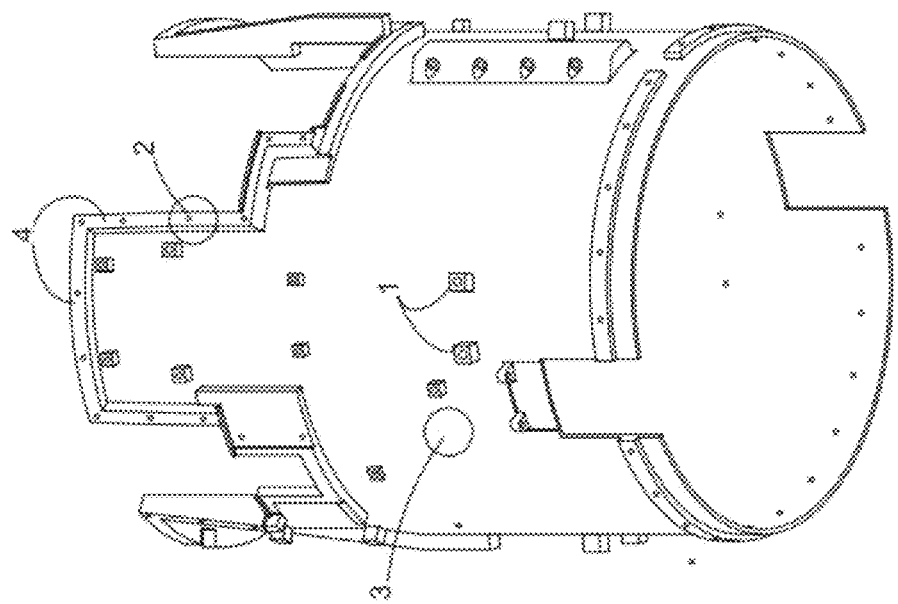
Figure 10:
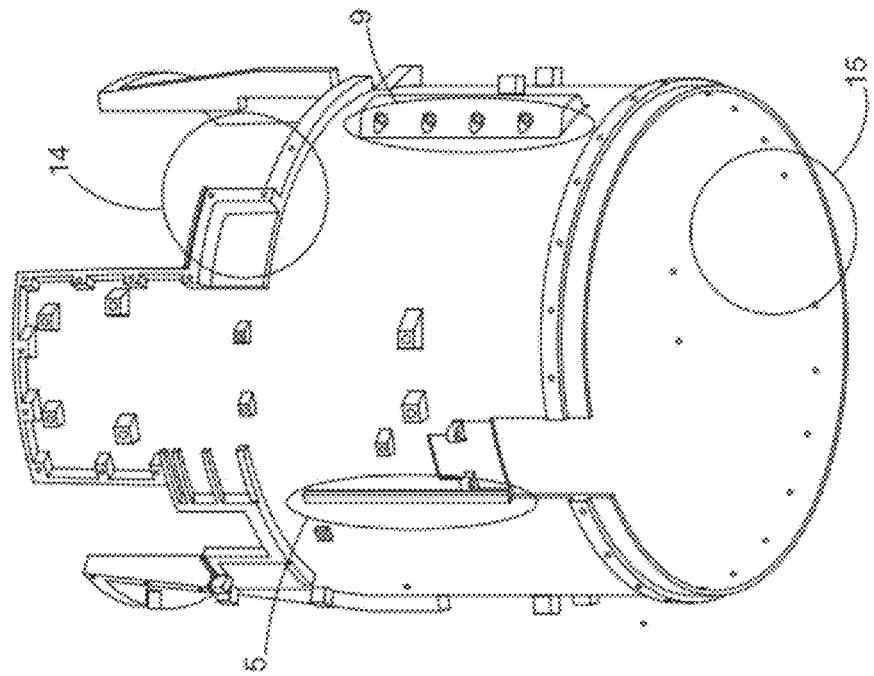
FIGS. 10-13 depict the baseplates of FIG. 9 at various orientations to highlight different structural features.
Figure 10:
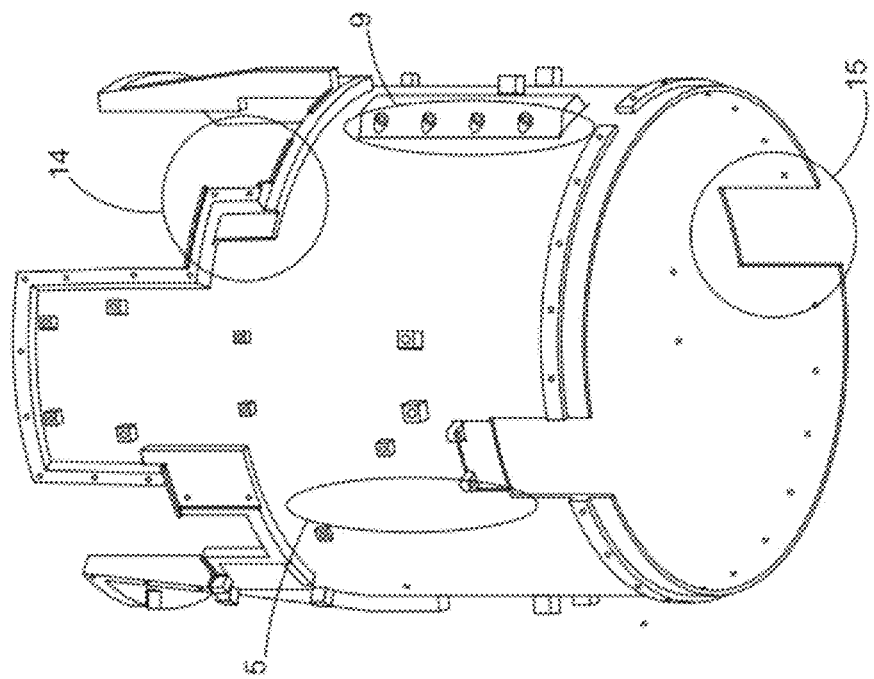
Figure 11:
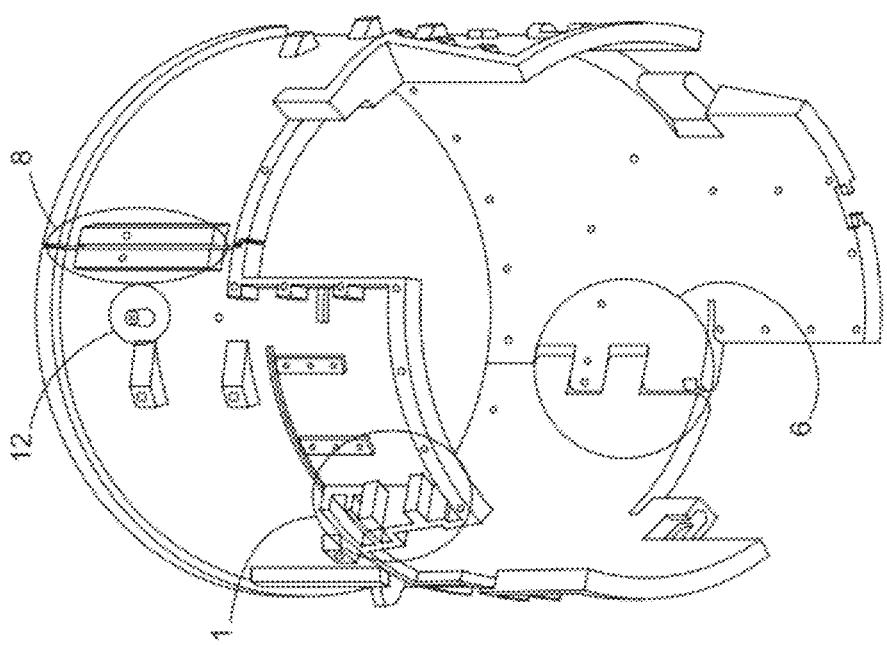
Figure 11:
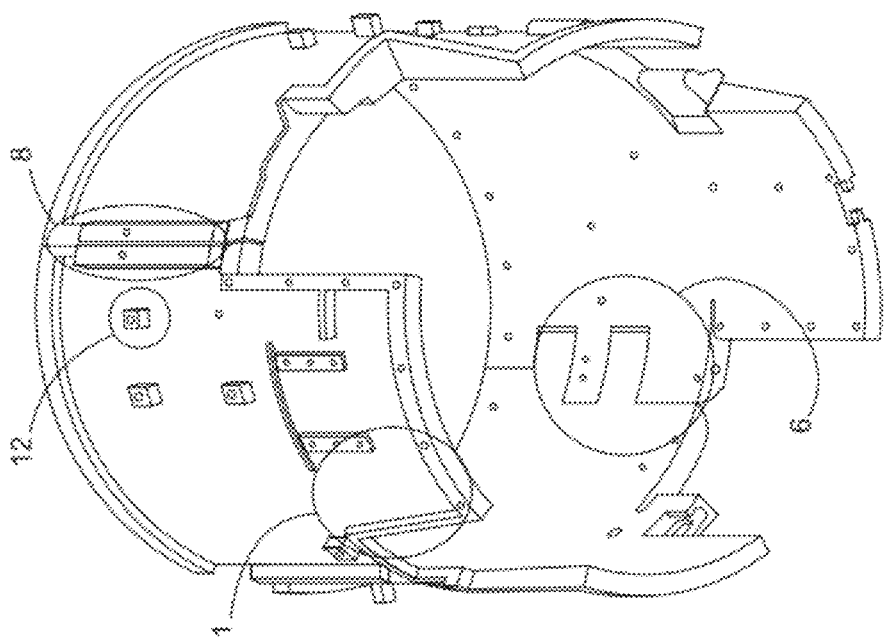
Figure 12:
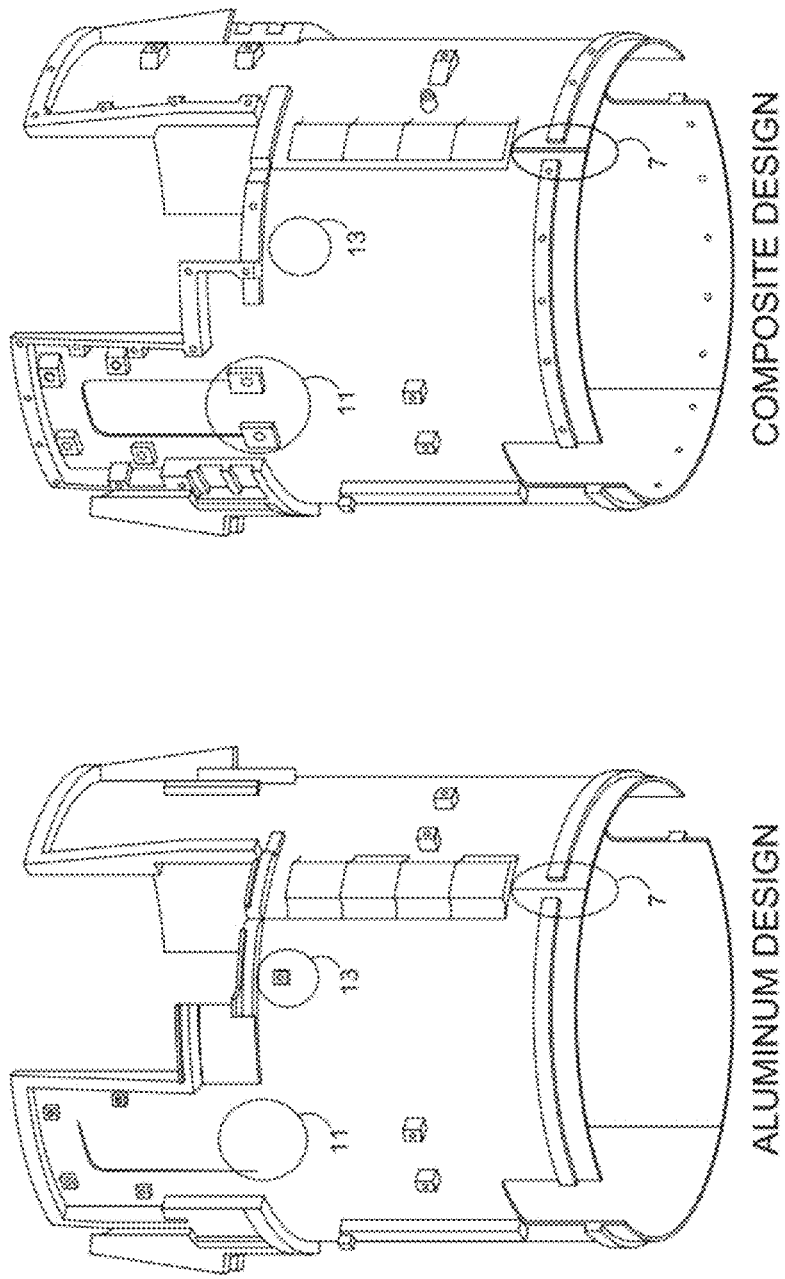
Figure 13:
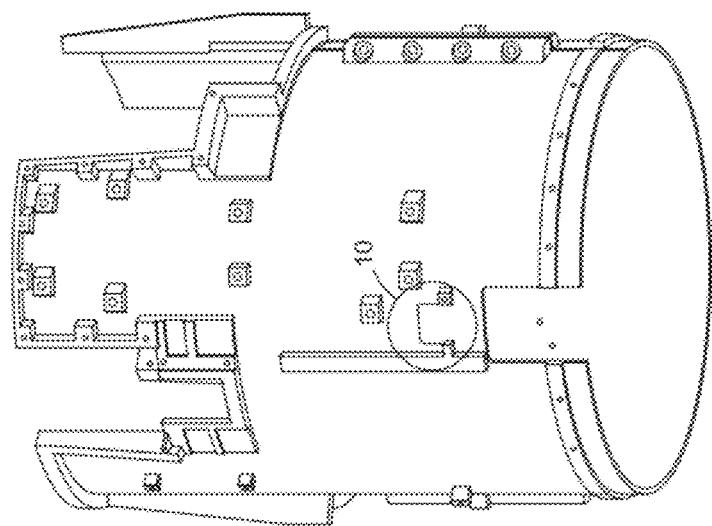
Figure 13:
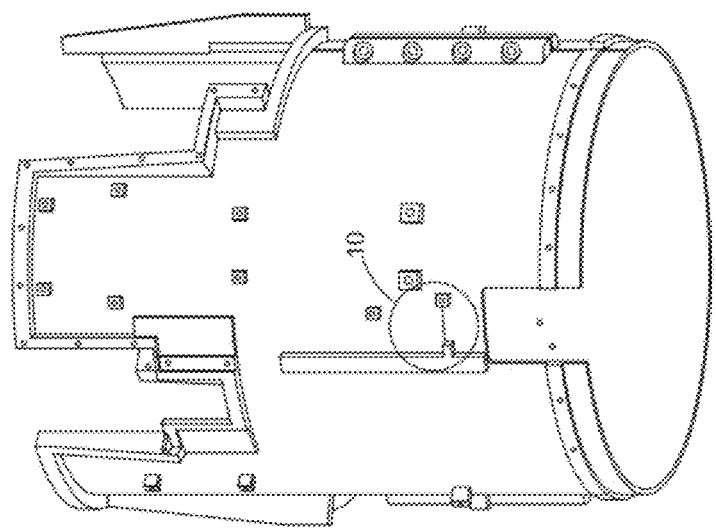

Process parameters for the baseplates of FIGS. 6-8 are provided below for Zones 1 to 10 of the plasticator (numbered from the input to output of the plasticator), the heated knife of the plasticator and the upper and bottom compression mold. Parameters for the unfilled baseplate as shown in FIG. 6 are presented in Table 1; parameters for the baseplate with the unfilled corner as shown in FIG. 7 are presented in Table 2; and parameters for the filled baseplate without degradation are presented in Table 3.

TABLE 1

| Zone | 1 | 2 | 3 | 4 | 5 | Exit Nozzle | Upper mold | Bottom mold |
|---|---|---|---|---|---|---|---|---|
| Temperature (° F.) | 535 | 535 | 560 | 560 | 580 | 580 | 250 | 250 |
| Injection Pressure (bar) | 1000 | | | | | | | |

TABLE 2

| Zone | 1 | 2 | 3 | 4 | 5 | Exit Nozzle | Upper mold | Bottom mold |
|---|---|---|---|---|---|---|---|---|
| Temperature (° F.) | 540 | 560 | 580 | 580 | 600 | 600 | 250 | 250 |
| Injection Pressure (bar) | 1000 | | | | | | | |

TABLE 3

| Zone | 1 | 2 | 3 | 4 | 5 | Exit Nozzle | Upper mold | Bottom mold |
|---|---|---|---|---|---|---|---|---|
| Temperature (° F.) | 550 | 570 | 590 | 600 | 610 | 610 | 260 | 260 |
| Injection Pressure (bar) | 1000 | | | | | | | |

ECM and IM processes for producing baseplates use the same starting material—LFT pellets. However, ECM differs from IM in terms of forming pressure and temperature involved during processing. In ECM, the plasticated charge is placed in a compression press and molded to shape in cycle times ranging from 45 seconds to 3 minutes depending upon the size of the part. The male mold and female mold cavity are open and separated with respect to each other during placement of the fiber-polymer charge. The closing action of the compression press brings the two mold halves towards each other as the part gets formed. In IM, the plasticated charge is forced through an injection head through a series of gates into a fixed cavity mold. Since the mold cavity is fixed, the material is subjected to high shear forces in the injection head/nozzle. Fiber length reduction is greater in IM because of the shearing of the fibers along the walls of the injection head. The part is formed as the fiber filled charge flows and fills the cavity. The part can be produced in 45 seconds to 3 minutes depending upon the size of the part.

Various structural differences between an embodiment of a long fiber thermoplastic baseplate and a prior art aluminum design are listed below, with the reference numbers corresponding to numbered areas in FIGS. 9-13. Notably, these features should be considered optional.

Undercuts (1) were eliminated at the bosses (26 bosses) and 12 vertical wall areas (12 areas). Mounting screw hole locations (2) (52 holes) were reconfigured to enable assembly of the baseplate to the aeroshell. Two additional holes (3) were added to the two mounting bars for assembly to the baseplates. Vertical wall thickness (4) was reduced to avoid warpage and shrinkage of the C/PAA long fiber thermoplastic part. Corners (5) were rounded for easy demolding from the mold. Hinge area (6) where the two baseplate halves assemble was redesigned to have less than 180 degree circumference to be able to adopt the long fiber thermoplastic molding processes. A slot (7) was added to the baseplates at the hinge area so that a hinge pin can be inserted to assemble the two halves of the baseplate. Rounded features (8) at bolting hole area (opposite to the hinge) were eliminated and a flat metal bar with tapped holes was designed and implemented for assembly. Rounded holes (9) (for socket head bolts) were replaced by square holes (to hold hex head bolts) at the bolting hole area (opposite to the hinge). The wall thickness (10) of a 0.8"×0.8" area at the notch area was reduced from 0.070" to 0.040". The wall thickness (11) of a 0.5"×0.5" area at the center of one baseplate was reduced from 0.070" to 0.040". A smaller sized rounded boss (12) was used to replace the cubic boss at the thruster area to accommodate the limited space at that area. A boss (13) was eliminated at the cable mount hole location. Stepped features (14) at the cable hole area were eliminated. A 1×1" notch (15) was eliminated.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of this disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A baseplate operative to mount a missile aeroshell, the baseplate being formed of a long fiber thermoplastic composite and exhibiting a wall thickness of no greater than approximately 0.070".

2. The baseplate of claim 1, wherein the wall thickness is in a range of 0.070"±0.030".

3. The baseplate of claim 1, wherein the long fiber thermoplastic composite exhibits a fiber weight fraction in a range of about 10% to 50%.

4. The baseplate of claim 1, wherein the long fiber thermoplastic composite exhibits a fiber weight fraction in a range of about 20% to 40%.

5. The baseplate of claim 1, wherein the long fiber thermoplastic composite exhibits a fiber weight fraction of approximately 30%.

6. The baseplate of claim 1, wherein the composite exhibits fiber lengths ranging from about 10 to 50 mm.

7. The baseplate of claim 1, wherein the composite exhibits fiber lengths ranging from about 10 to 25 mm.

8. The baseplate of claim 1, wherein the fibers comprise carbon fibers.

9. The baseplate of claim 1, wherein the composite comprises a polymer matrix of poly aryl amide.

10. The baseplate of claim 1 produced by long fiber thermoplastic extrusion-compression molding (ECM).

11. The baseplate of claim 1 produced by long fiber thermoplastic injection molding (IM).

12. A baseplate operative to mount a missile aeroshell, the baseplate being formed of a long fiber thermoplastic composite, the long fiber thermoplastic composite exhibiting a fiber weight fraction in a range of about 10% to 50% and fiber lengths ranging from about 10 to 25 mm.

\* \* \* \* \*